US006840273B2

(12) United States Patent
Miyazoe et al.

(10) Patent No.: US 6,840,273 B2
(45) Date of Patent: Jan. 11, 2005

(54) MANIFOLD VALVE HAVING POSITION DETECTING MECHANISM

(75) Inventors: Shinji Miyazoe, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/407,237

(22) Filed: Apr. 7, 2003

(65) Prior Publication Data

US 2003/0226594 A1 Dec. 11, 2003

(30) Foreign Application Priority Data

Jun. 11, 2002 (JP) ....................................... 2002-169398

(51) Int. Cl.[7] ................................................ F15B 13/043

(52) U.S. Cl. ............. 137/554; 137/625.64; 137/625.65; 137/884; 137/315.03

(58) Field of Search ............................ 137/554, 625.64, 137/625.65, 884, 315.03

(56) References Cited

U.S. PATENT DOCUMENTS 6,220,284 B1 * 4/2001 Hayashi et al. ............. 137/554
6,263,915 B1 * 7/2001 Hayashi et al. ............. 137/554
6,267,140 B1 * 7/2001 Hayashi et al. ............. 137/554
6,283,149 B1 * 9/2001 Hayashi et al. ............. 137/554
6,427,720 B1 * 8/2002 Hayashi et al. ............. 137/554
6,505,642 B2 * 1/2003 Miyazoe et al. ............ 137/554
6,520,202 B2 * 2/2003 Miyazoe et al. ............ 137/554
6,591,865 B2 * 7/2003 Misumi ...................... 137/554
6,612,332 B2 * 9/2003 Miyazoe et al. ............ 137/552

* cited by examiner

*Primary Examiner*—A. Michael Chambers
(74) *Attorney, Agent, or Firm*—Oblon, Spivak, McClelland, Maier & Neustadt, P.C.

(57) ABSTRACT

In a manifold valve, a magnet is mounted to a spool of a solenoid valve, magnetometric sensors and connecting pins to be brought into continuity with the respective magnetometric sensors are provided in a first recessed portion formed in a casing, a sensor connector in a second recessed portion and a main wiring substrate connected to the sensor connector in a substrate housing chamber are provided to a manifold base, and the connecting pins are connected to the sensor connector to thereby electrically connect the magnetometric sensors to the main wiring substrate when the solenoid valve is mounted onto the manifold base.

4 Claims, 2 Drawing Sheets

MANIFOLD VALVE HAVING POSITION DETECTING MECHANISM

TECHNICAL FIELD TO WHICH THE INVENTION BELONDS

The present invention relates to a manifold valve having a position detecting mechanism, the manifold valve detecting an operating position of a valve member of a solenoid valve mounted onto a manifold base with a position detecting mechanism formed of a magnet and magnetometric sensors.

PRIOR ART

There is a known solenoid vale in which an operating position of a spool can be detected by using a magnet and a magnetometric sensor as disclosed in Japanese Utility Model Publication No. 2-66784, for example. This solenoid valve is formed by mounting the magnet to an outer periphery of the spool and mounting the magnetometric sensor for sensing magnetism to a casing. When the spool moves to one selecting position, the magnetometric sensor senses the magnet and is turned on. When the spool moves to the other selecting position, the magnetometric sensor is separated from the magnet and turned off. The magnetometric sensor is connected to a controller by a lead wire which is led outside from the casing of the solenoid valve.

On the other hand, solenoid valves of this type include one used as a manifold valve when it is placed on a manifold base. This manifold valve is normally formed by placing one or more solenoid valves on the manifold base such that pressure fluid and a driving signal are supplied to the respective solenoid valves through the manifold base.

In such a manifold valve, similarly to the above-described known art, it is possible to detect the operating positions of the respective solenoid valves by using the magnet and the magnetometric sensor. In this case, however, it is necessary to route a lead wire outside the casing and to introduce and connect the lead wire into an electric connection portion of the manifold base if the lead wire from the magnetometric sensor is lead out of the casing of the solenoid valve like in the know art. As a result, problems such as burdensome and disorderly wiring and interference of the lead wire with other members are likely to occur. Because the sensor connected by the lead wire to the manifold base has to be detached from the casing or the lead wire has to be cut off from the manifold base in order to separate the manifold base and the solenoid valve from each other in maintenance, handling is burdensome.

DISCLOSURE OF THE INVENTION

It is a technical object of the present invention to provide a manifold valve having a position detecting mechanism in which mounting of magnetometric sensors to a solenoid valve is easy and wiring between the magnetometric sensors and a manifold base is easy and which is easy to handle in maintenance.

To achieve the above object, according the invention, there is provided a manifold valve comprising a solenoid valve for selecting a flow path of pressure fluid and a manifold base mounted with the solenoid valve. The solenoid valve includes a casing having a mounting face to be mounted to the manifold base, a valve member provided in the casing, driving mechanisms for driving the valve member, a magnet mounted to an end of the valve member to detect a position, and a first recessed portion provided at a position of the mounting face corresponding to the magnet. One or more magnetometric sensors for detecting the magnet and a connecting pin to be brought into continuity with the magnetometric sensors are housed in the first recessed portion.

The manifold base includes a placing face on which the solenoid valve is mounted, a second recessed portion formed at a position on the placing face corresponding to the first recessed portion, a substrate housing chamber inside the base and connected to the second recessed portion, a sensor connector disposed in the second recessed portion, and a main wiring substrate which is disposed in the substrate housing chamber, which is mounted with an electronic component for signal processing and connectors for feeding and signal transmission, and to which the sensor connector is electrically connected. The sensor connector has a contact which can come in contact with the connecting pin and the contact comes in contact with and is electrically connected to the connecting pin when the solenoid valve is mounted on the manifold base.

In the manifold valve of the invention having the above structure, the first recessed portion is formed in the casing of the solenoid valve, the magnetometric sensors and the connecting pin to be brought into continuity with the magnetometric sensors are provided in the recessed portion, the second recessed portion is formed at the position of the manifold base corresponding to the first recessed portion, and the sensor connector is provided in the recessed portion. As a result, by only mounting the solenoid valve onto the manifold base, the connecting pin and the sensor connector are connected and the magnetometric sensors in the solenoid valve are electrically connected to the main wiring substrate in the manifold base. Therefore, not only mounting of the magnetometric sensors and connection of the magnetometric sensors to the main wiring substrate but also wiring is easy because there is no need to route the lead wires from the magnetometric sensors outside. Moreover, because there is no need to detach the magnetometric sensors from the solenoid valve or to cut the lead wire between the solenoid valve and the manifold base in order to separate the manifold base and the solenoid valve from each other in maintenance, handling is easy.

According to a concrete structural form of the invention, the first recessed portion is partitioned by a partition member into an inner sensor chamber and an outer electric connection chamber, the magnetometric sensors are disposed in the inner sensor chamber, the connecting pin extends through the partition member to project into the outer electric connection chamber, the sensor connector includes a connecting portion having a tip end portion projecting from the placing face, and the connecting portion is fitted in the electric connection chamber to thereby connect the contact and the connecting pin.

According to another concrete structural form of the invention, the casing of the solenoid valve includes a main block in which the valve member is mounted, an auxiliary block which is connected to an end of the main block and in which a portion of an end of the valve member and mounted with the magnet slides, and first and second end blocks respectively connected to end portions of the auxiliary block and the main block and the first recessed portion is formed in the auxiliary block.

DETAILED DESCRITION

Figure 1:
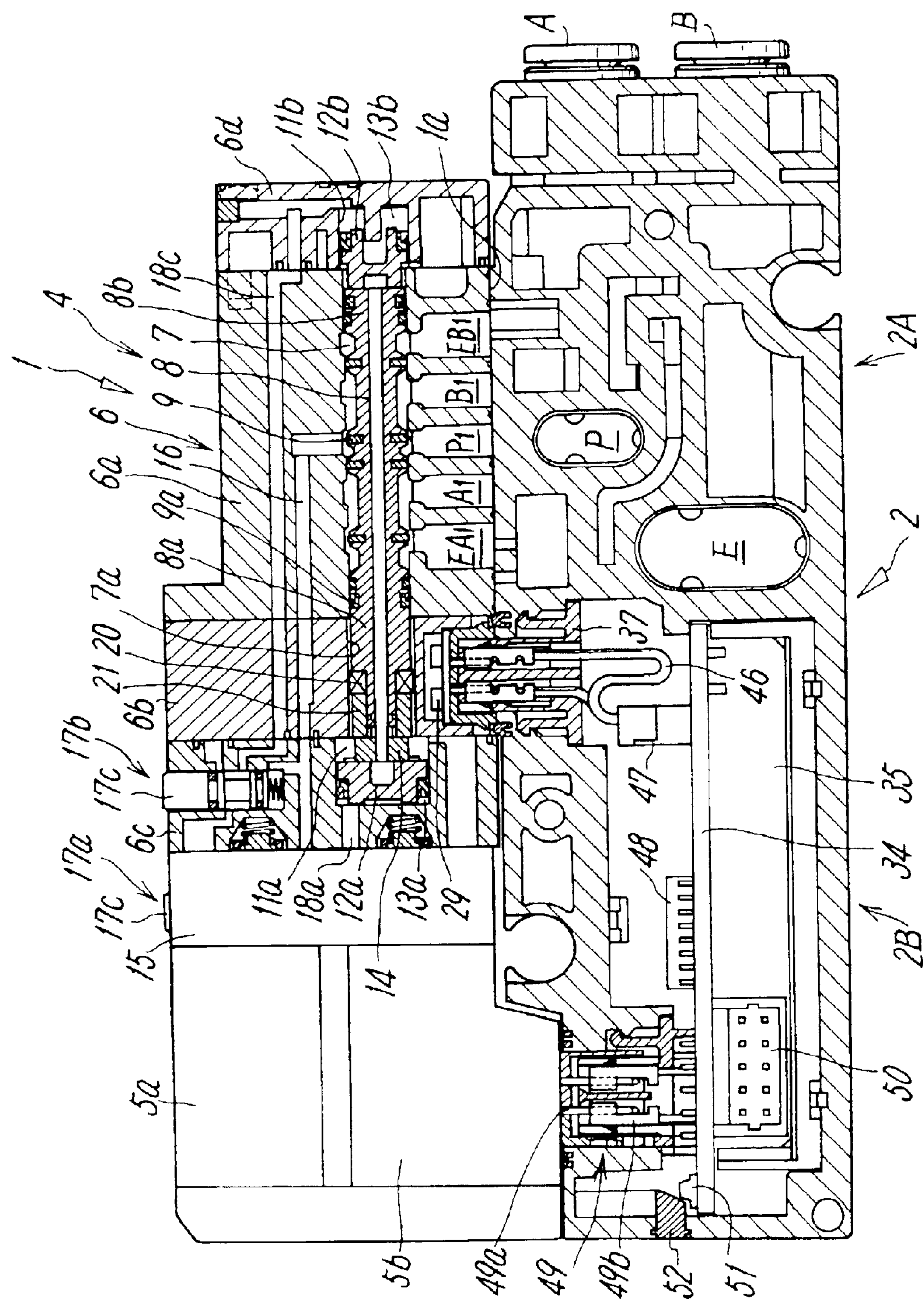
FIG. 1 is a sectional view of an embodiment of a manifold valve according to the present invention.

FIG. 1 shows a representative embodiment of a manifold valve according to the present invention. The manifold valve is formed of a solenoid valve 1 for selecting a flow path of pressure fluid such as compressed air and a manifold base 2 mounted with the solenoid valve 1 to supply the pressure fluid and transmit an electric signal and the like from the manifold base 2 to the solenoid valve 1.

The solenoid valve 1 is a pilot-type solenoid valve and includes a main valve 4 having a five-port valve structure and solenoid-operated pilot valves 5*a* and 5*b* connected to the main valve 4 to switch a valve member mounted in the main valve 4 with the pilot valves 5*a* and 5*b*. Therefore, the pilot valves 5*a*, 5*b* form a driving mechanism for driving the valve member of the main valve 4.

The main valve 4 includes a casing 6 formed of non-magnetic material. The casing 6 is formed of a main block 6*a* having a rectangular section, an auxiliary block 6*b* joined to an end of the main block 6*a*, and a first end block 6*c* and a second end block 6*d* respectively joined to end faces of the auxiliary block 6*b* and the main block 6*a*. A lower face of the casing 6 and especially a lower face of the main block 6*a* is formed as a substantially flat mounting face 1*a* to be joined to a placing face 2*a* on an upper face of the manifold base 2.

A portion of the mounting face 1*a* corresponding to a bottom face of the main block 6*a* is provided with a supply through hole $P_1$, two output through holes $A_1$ and $B_1$ positioned on opposite sides of the supply through hole $P_1$, and two discharge through holes $EA_1$ and $EB_1$ positioned on opposite sides of the output through holes $A_1$ and $B_1$. Inside the main block 6*a* and the auxiliary block 6*b*, a valve hole 7 with which the above respective through holes communicate in the above-described arrangement is formed. In the valve hole 7, a spool 8 which is a valve member for selecting the flow path is housed for sliding. At an outer periphery of the spool 8, a plurality of sealing members 9 for selecting the flow path between the respective ports are provided.

A first end 8*a* of the spool 8 in an axial direction extends into the auxiliary block 6*b* and moves in a valve hole portion 7*a* in the auxiliary block 6*b*. At an outer periphery of the first end 8*a*, a magnet 20 for detecting a position is mounted. The magnet 20 is in a ring shape and is fitted over a small-diameter portion formed at the first end 8*a*. By fitting and pressing an annular cap 21 with and against the magnet 20 from an outer side, the magnet 20 is fixed to an end portion of the spool 8 by the cap 21.

The valve hole portion 7*a* in the auxiliary block 6*b* is isolated from the flow paths of the pressure fluid by a sealing member 9*a* at the end portion of the spool 8 such that the magnet 20 positioned in the valve hole portion 7*a* does not directly come in contact with the pressure fluid. Therefore, if moisture, chemical mist, particles of magnetic material such as metal powder, and the like are included in the pressure fluid, the magnet 20 does not rust or corrode in contact with the moisture and chemical mist and does not attract the particles of magnetic material. As a result, reduction of accuracy of position detection due to reduction of magnetic force and an inoperable state of the spool 8 due to the attracted minute particles do not occur.

In the first end block 6*c* and the second end block 6*d*, piston chambers 11*a* and 11*b* are formed respectively at positions where opposite ends of the spool 8 face. Out of both the piston chambers, the first piston chamber 11*a* formed in the first end block 6*c* has a large diameter. A large-diameter first piston 12*a* is housed for sliding in the first piston chamber 11*a* and is in contact with an end face of the cap 21, i.e., an end face of the first end 8*a* of the spool 8 through a spacer 14. The spacer 14 may be integral with one of the cap 21 and the first piston 12*a*. The second piston chamber 11*b* formed in the second end block 6*d* has a smaller diameter than the first piston chamber 11*a*. A small-diameter second piston 12*b* is housed for sliding in the second piston chamber 11*b* and is in direct contact with an end face of the second end 8*b* of the spool 8.

In the respective piston chambers 11*a* and 11*b*, first and second pressure chambers 13*a* and 13*b* are formed respectively on back face sides of the respective pistons 12*a* and 12*b*. The first pressure chamber 13*a* positioned behind the large-diameter first piston 12*a* communicates with the supply port $P_1$ through a pilot supply flow path 16, a manual operation mechanism 17*a* provided to a relay block 15, the pilot valve 5*a*, and a pilot output flow path 18*a*. The second pressure chamber 13*b* behind the small-diameter second piston 12*b* communicates with the supply port $P_1$ through the pilot supply flow path 16, the other pilot valve 5*b*, a pilot output flow path 18*b*, a manual operation mechanism 17*b*, and a pilot output flow path 18*c*.

When the one pilot valve 5*a* is turned off, the first pressure chamber 13*a* opens into the atmosphere, the other pilot valve 5*b* is turned on, and pilot fluid from the pilot supply flow path 16 is supplied to the second pressure chamber 13*b* through the pilot output flow paths 18*b* and 18*c*, the spool 8 is pushed by the second piston 12*b* to occupy a first selecting position where the spool 8 has been displaced leftward as shown in FIG. 1. If a switch between the pilot valves 5*a* and 5*b* is carried out from this state such that the pilot valve 5*a* is turned on and that the pilot valve 5*b* is turned off, the second pressure chamber 13*b* opens into the atmosphere and the pilot fluid is supplied to the first pressure chamber 13*a*. Therefore, the spool 8 is pushed by the piston 12*a*, moved rightward, and switched to a second selecting position.

The manual operation mechanisms 17*a* and 17*b* are respectively for manually obtaining selecting states similar to those when the pilot valves 5*a* and 5*b* are turned on and used during a power failure or when the pilot valves are out of order. In other words, the manual operation mechanism 17*a* corresponds to the pilot valve 5*a*. By pushing down an operation member 17*c*, the pilot supply flow path 16 and the pilot output flow path 18*a* directly communicate with each other and pilot fluid is supplied to the first pressure chamber 13*a* from the supply port $P_1$. The other manual operation mechanism 17*b* corresponds to the pilot valve 5*b*. By pushing down an operation member 17*c*, the pilot supply flow path 16 and the pilot output flow path 18*c* directly communicate with each other and the pilot fluid is supplied to the second pressure chamber 13*b* from the supply port $P_1$.

The pilot valves 5*a* and 5*b* are for opening and closing the pilot flow paths by energizing to a solenoid. Because structures and operations of the pilot valves 5*a* and 5*b* are similar to those of known pilot valves, concrete descriptions of them will be omitted.

Figure 2:
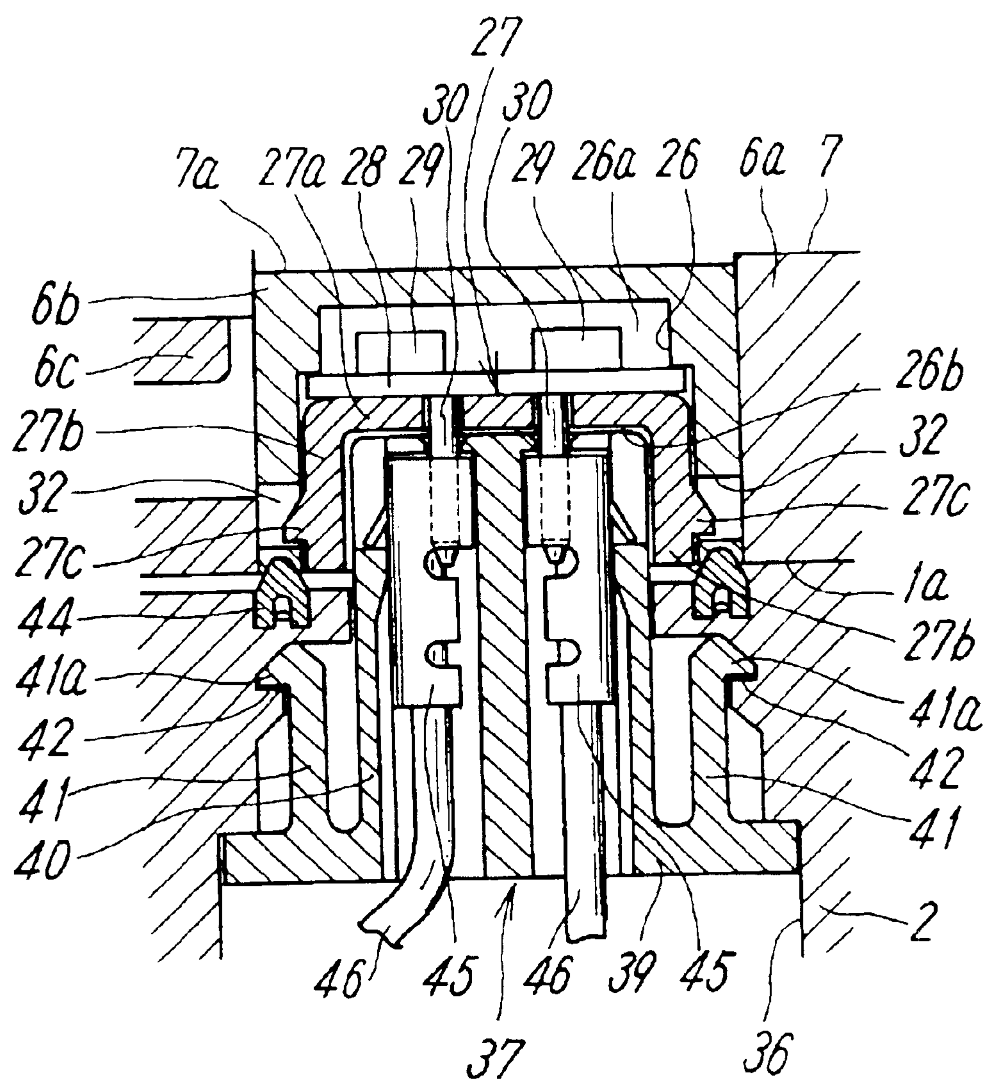
FIG. 2 is an enlarged view of an essential portion of FIG. 1.

The mounting face 1*a* formed on the casing 6 of the solenoid valve 1 is formed with a first recessed portion 26 at a position corresponding to the magnet 20, i.e., a position which is a bottom face of the auxiliary block 6*b* as shown in FIG. 2 in detail. An inside of the recessed portion 26 is partitioned by an angular-U-shaped partition member 27 into an inner sensor chamber 26*a* and an outer electric connection chamber 26*b*. In the sensor chamber 26*a*, a sensor substrate 28 mounted to the partition member 27 and two magnetometric sensors 29, 29 mounted to the sensor substrate 28 are housed. These magnetometric sensors 29, 29 are disposed at a required interval therebetween in view of a distance of movement of the magnet 20 to detect an operating position of the spool 8 at opposite stroke ends of reciprocation. In the electric connection chamber 26*b*, two connecting pins 30, 30 mounted at base ends thereof to the sensor substrate 28 extend through the partition member 27 and each of the connecting pins is electrically continuous with one of the magnetometric sensors 29, 29 through the sensor substrate 28.

The partition member 27 includes a plate-shaped main body portion 27*a* to be mounted with the sensor substrate 28, elastic leg portions 27*b*, 27*b* extending perpendicularly downward from opposite ends of the main body portion 27*a* along side walls of the first recessed portion 26, and projections 27*c* for locking and provided respectively on outer faces of the leg portions 27*b*, 27*b*. By inserting the partition member 27 into the first recessed portion 26 from a lower face side of the auxiliary block 6*b* to elastically lock the projections 27*c* into locking holes 32 formed in side faces of the recessed portion 26, the partition member 27 is detachably mounted into the first recessed portion 26.

The manifold base 2 is of a stacking type used by joining a plurality of manifold bases together in a thickness direction and is made of non-magnetic material such that one solenoid valve 1 can be mounted to the manifold base 2. A half of the manifold base 2 in a longitudinal direction is formed into a flow path forming portion 2A and the other half is formed into an electric connection portion 2B. On an upper face of the manifold base 2, the placing face 2*a* is formed astride the flow path forming portion 2A and the electric connection portion 2B. The flow path forming portion 2A and the electric connection portion 2B may be formed integrally or may be formed separately and connected to each other.

In the flow path forming portion 2A, a supply flow path P and a discharge flow path E passing through the manifold base 2 in the thickness direction are formed and two output ports A and B which open in an end face of the manifold base 2 are formed. The supply flow path P, the discharge flow path E, and the respective output ports A and B respectively communicate with a supply through hole, two discharge through holes, and two output through holes open on the placing face 2*a* through connecting holes formed in the flow path forming portion 2A. When the solenoid valve 1 is mounted onto the placing face 2*a*, these respective through holes respectively communicate with the supply through hole $P_1$, the two discharge through holes $EA_1$ and $EB_1$, and the two output through holes $A_1$ and $B_1$ open in the mounting face 1*a* of the solenoid valve 1.

The electric connection portion 2B includes in itself a substrate housing chamber 35 in which a main wiring substrate 34 is housed and a second recessed portion 36 connected to the substrate housing chamber 35 at a position on the placing face 2*a* corresponding to the first recessed portion 26. In the second recessed portion 36, a sensor connector 37 is provided. The sensor connector 37 includes a prism-shaped connecting portion 40 standing from a central portion of a base member 39 and a pair of elastic locking chips 41, 41 positioned on opposite sides of the connecting portion 40 and having locking projections 41*a* at tip ends. The locking chips 41, 41 are formed to be lower than the connecting portion 40. By locking the projections 41*a*, 41*a* at the tip ends of the locking chips 41, 41 into locking holes 42, 42 formed in side walls of the second recessed portion 36, the sensor connector 37 is detachably mounted into the second recessed portion 36 with a tip end portion of the connecting portion 40 projecting upward from the placing face 2*a*.

Inside the connecting portion 40, two cylindrical contacts 45, 45 are arranged and are connected to the main wiring substrate 34 respectively through lead wires 46 and a first connector 47 such that the contacts 45, 45 can be disconnected. If the solenoid valve 1 is mounted onto the manifold base 2, the tip end portion of the connecting portion 40 in the sensor connector 37 is fitted in the electric connection chamber 26*b* and each the contact 45 comes in contact with one of the connecting pins 30 to thereby electrically connect the magnetometric sensors 29, 29 to the main wiring substrate 34.

The manifold base 2 is mounted with a sealing member 44 with which the second recessed portion 36 is surrounded. If the solenoid valve 1 is mounted onto the manifold base 2 as described above, the sealing member 44 comes in contact with a lower face of the casing 6 of the solenoid valve 1, i.e., a lower face of the auxiliary block 6*b* such that the first recessed portion 26 is surrounded with the sealing member 44 to thereby seal the first and second recessed portions 26 and 36.

The main wiring substrate 34 is for receiving control signals for the solenoid valve 1 such as serial signals and parallel signals sent from a controller and detection signals output from the magnetometric sensors 29 and for processing and transmitting these electric signals. Therefore, on the main wiring substrate 34, electronic components 48 for performing signal processing and a plurality of connectors 47, 49, and 50 used for feeding and transmitting electric signals are mounted and printed wiring for connecting the respective electronic component 48 and the connectors 47, 49, and 50 is installed.

The first connector 47 is for connecting the sensor connector 37 to the main wiring substrate 34. A position detection signal output from the magnetometric sensor 29 is sent to the main wiring substrate 34 through the first connector 47, subjected to signal processing in the electronic component 48 if necessary, and then sent to the controller. The second connector 49 is for connecting the solenoid valve 1 and the main wiring substrate 34 and formed such that connecting terminals 49*a* provided to a lower face of the solenoid valve 1 are automatically connected to connecting terminals 49*b* of the main wiring substrate 34 by mounting the solenoid valve 1 onto the placing face 2*a* of the manifold base 2. The third connector 50 is for connecting the main wiring substrates 34, 34 installed in the adjacent manifold bases 2, 2 to each other and is formed such that female and male connecting terminals provided to both the manifold bases 2, 2 are connected to each other by joining the manifold bases 2, 2 to each other.

An indicating lamp 51 for indicating an operating state of the spool 8 is mounted onto an end portion of the main wiring substrate 34 and an indicating window 52 covered with a transparent member is provided to an end face of the manifold base 2 to correspond to the indicating lamp 51. Through the indicating window 52, the indicating lamp 51 can be seen. The indicating lamp 51 lights up when a selecting operation of the spool 8 has not been carried out normally to indicate it according to the position detection signal output from the magnetometric sensors 29.

In the manifold valve having the above structure, the first recessed portion 26 is formed in the casing 6 of the solenoid valve 1, the magnetometric sensors 29, 29 and the connecting pins 30, 30 to be brought into continuity with the magnetometric sensors 29, 29 are provided in the recessed portion 26, the second recessed portion 36 is formed at the position of the manifold base 2 corresponding to the first recessed portion 26, and the sensor connector 37 is provided in the recessed portion 36. As a result, by only mounting the solenoid valve 1 onto the manifold base 2, the connecting pins 30, 30 and the sensor connector 37 are connected and the magnetometric sensors 29, 29 in the solenoid valve 1 are electrically connected to the main wiring substrate 34 in the manifold base 2. Therefore, not only mounting of the magnetometric sensors 29, 29 but also wiring is easy because there is no need to route the lead wires from the magnetometric sensors 29, 29 outside. Moreover, because there is no need to detach the magnetometric sensors 29, 29 from the solenoid valve 1 or to cut the lead wire between the solenoid valve 1 and the manifold base 2 in order to separate the manifold base 2 and the solenoid valve 1 from each other in maintenance, handling is easy.

The casing 6 of the solenoid valve 1 is divided into the main block 6*a* in which the spool 8 is mounted, the auxiliary block 6*b* connected to the one end of the main block 6*a*, and the first and second end blocks 6*c* and 6*d* respectively connected to the end portions of the auxiliary block 6*b* and the main block 6*a*, the magnet 20 is mounted to the end portion of the spool 8 in the auxiliary block 6*b* and the first recessed portion 26 is formed in the auxiliary block 6*b*, and the sensor connector 37 is mounted in the first recessed portion 26. As a result, parts common to a normal solenoid valve are used for the main block 6*a* and the first and second end blocks 6*c* and 6*d* and only the auxiliary block 6*b* may newly be added. Therefore, it is possible to share parts to rationally form the various solenoid valves.

Although the two pilot valves 5*a* and 5*b* are gathered on one side of the main valve 4, i.e., on a side of the first end block 6*c* in the above embodiment, the pilot valves 5*a* and 5*b* may be disposed respectively on the side of the first end block 6*c* and on the side of the second end block 6*d*. In the case of the double-pilot-type solenoid valve including the two pilot valves as described above, diameters of the two pistons 12*a* and 12*b* are not necessarily different from each other, i.e., large and small but the pistons of the same diameters may be used.

It is also possible that the solenoid valve 1 is a single-pilot-type solenoid valve for switching a spool with one pilot valve. In this case, the pilot valve 5*b* corresponding to the small-diameter second piston 12*b* is omitted, the second pressure chamber 13*b* communicates with the supply port $P_1$ through the pilot output flow path 18*c*, the manual operation mechanism 17*b*, and the pilot supply flow path 16 such that the pilot fluid is supplied constantly. If the one pilot valve 5*b* is omitted in FIG. 1, a dummy body substantially in the same shape and of the same dimensions as the omitted pilot valve can be mounted to the position to thereby form the solenoid valve in the same outside shape as the double-pilot-type solenoid valve.

Although the two magnetometric sensors 29, 29 for detecting the operating position of the spool 8 at the opposite stroke ends of reciprocation are provided in the above embodiment, only one magnetometric sensor may be provided to detect the operating position at any one of the stroke ends.

It is needless to say that the invention can also be applied to a manifold valve having a solenoid valve which is not of the spool type, e.g., a manifold valve having a poppet-type solenoid valve.

According to the invention, the first recessed portion is formed in the casing of the solenoid valve, the magnetometric sensors and the connecting pins to be brought into continuity with the magnetometric sensors are provided in the recessed portion, the second recessed portion is formed at the position of the manifold base corresponding to the first recessed portion, and the sensor connector is provided in the recessed portion. As a result, by only mounting the solenoid valve onto the manifold base, the connecting pins and the sensor connector are electrically connected and the magnetometric sensors in the solenoid valve are easily and reliably connected to the main wiring substrate in the manifold base. Therefore, not only mounting of the magnetometric sensors and connection of the magnetometric sensors to the main wiring substrate but also wiring is easy because there is no need to route the lead wires from the magnetometric sensors outside. Moreover, because there is no need to detach the magnetometric sensors from the solenoid valve or to cut the lead wire between the solenoid valve and the manifold base in order to separate the manifold base and the solenoid valve from each other in maintenance, handling is easy.

What is claimed is:

1. A manifold valve having a position detecting mechanism, the valve comprising: a solenoid valve for selecting a flow path of pressure fluid and a manifold base mounted with the solenoid valve, wherein the solenoid valve includes a casing having a mounting face to be mounted to the manifold base, a valve member provided in the casing, driving mechanisms for driving the valve member, a magnet mounted to an end of the valve member to detect a position, and a first recessed portion provided at a position of the mounting face corresponding to the magnet, one or more magnetometric sensors for detecting the magnet and a connecting pin to be brought into continuity with the magnetometric sensors are housed in the first recessed portion, the manifold base includes a placing face on which the solenoid valve is mounted, a second recessed portion formed on a position of the placing face corresponding to the first recessed portion, a substrate housing chamber inside the base and connected to the second recessed portion, a sensor connector disposed in the second recessed portion, and a main wiring substrate which is disposed in the substrate housing chamber, which is mounted with an electronic component for signal processing and connectors for feeding and signal transmission, and to which the sensor connector is electrically connected, the sensor connector has a contact which can come in contact with the connecting pin and the contact comes in contact with and is electrically connected to the connecting pin when the solenoid valve is mounted on the manifold base.

2. A manifold valve according to claim 1, wherein the first recessed portion is partitioned by a partition member into an inner sensor chamber and an outer electric connection chamber, the magnetometric sensors are disposed in the inner sensor chamber, the connecting pin extends through the partition member to project into the outer electric connection chamber, the sensor connector includes a connecting portion having a tip end portion projecting from the placing face, and the connecting portion is fitted in the electric connection chamber to thereby connect the contact and the connecting pin.

3. A manifold valve according to claim 1, wherein the casing of the solenoid valve includes a main block in which the valve member is mounted, an auxiliary block which is connected to an end of the main block and in which a portion of an end of the valve member and mounted with the magnet slides, and first and second end blocks respectively connected to end portions of the auxiliary block and the main block and the first recessed portion is formed in the auxiliary block.

4. A manifold valve according to claim 2, wherein the casing of the solenoid valve includes a main block in which the valve member is mounted, an auxiliary block which is connected to an end of the main block and in which a portion of an end of the valve member and mounted with the magnet slides, and first and second end blocks respectively connected to end portions of the auxiliary block and the main block and the first recessed portion is formed in the auxiliary block.

* * * * *